(12) United States Patent
Ando

(10) Patent No.: US 7,785,687 B2
(45) Date of Patent: Aug. 31, 2010

(54) MOLDED RESIN PRODUCT

(75) Inventor: Yukiya Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 266 days.

(21) Appl. No.: 12/149,259

(22) Filed: Apr. 29, 2008

(65) Prior Publication Data

US 2008/0286532 A1 Nov. 20, 2008

(30) Foreign Application Priority Data

May 14, 2007 (JP) .............................. 2007-128245

(51) Int. Cl.
*B32B 3/06* (2006.01)

(52) U.S. Cl. ......................................................... 428/57

(58) Field of Classification Search .................... 428/57
See application file for complete search history.

(56) References Cited

U.S. PATENT DOCUMENTS

2006/0073302 A1  4/2006  Itakura et al.
2006/0278113 A1  12/2006  Kawagoe et al.
2007/0021549 A1  1/2007  Kojima et al.

FOREIGN PATENT DOCUMENTS

| JP | A-2002-284895 | 10/2002 |
|----|---------------|---------|
| JP | A-2005-007759 | 1/2005 |
| JP | A-2007/15792 | 1/2005 |
| JP | A-2005-133087 | 5/2005 |
| JP | A-2006-096886 | 4/2006 |
| JP | A-2006-168221 | 6/2006 |
| JP | A-2006-205619 | 8/2006 |
| JP | A-2006-312303 | 11/2006 |

OTHER PUBLICATIONS

Office Action dated May 19, 2009 from the Japan Patent Office in the corresponding JP application No. 2007-128245 (and English Translation).

*Primary Examiner*—Alexander Thomas
(74) *Attorney, Agent, or Firm*—Posz Law Group, PLC

(57) ABSTRACT

A molded resin product obtained by irradiating laser light L on an overlapping part 11 having overlapped therein a transmitting material 2 mainly comprising a thermoplastic polyester and transmitting laser light, and an absorbing material 3 mainly comprising polyphenylene sulfide and absorbing laser light, from the side of the transmitting material 2 to weld together the transmitting material 2 and the absorbing material 3. The transmitting material 2 comprises polyamide 6 blended in the thermoplastic polyester.

9 Claims, 8 Drawing Sheets

MOLDED RESIN PRODUCT

TECHNICAL FIELD

The present invention relates to a molded resin product obtained by joining together a transmitting material mainly comprising a thermoplastic polyester and an absorbing material mainly comprising polyphenylene sulfide, by laser welding.

BACKGROUND ART

A molded resin product obtained by joining together two or more resin molding members by laser welding is conventionally known. Laser welding is a method of irradiating laser light on an overlapping part having overlapped therein a transmitting material which transmits laser light and an absorbing material which absorbs laser light, from the side of the transmitting material to weld together the absorbing material and the transmitting material.

Other methods for joining resin members together, means such as vibration welding, ultrasonic welding and bonding by an adhesive are known, but taking into consideration the effect on an electronic component or the like incorporated into the molded resin product, the degree of freedom in joining, airtightness thereof and the like, the technique of laser welding is excellent.

In recent years, polyphenylene sulfide (PPS) is attracting attention as a thermoplastic resin excellent in heat resistance and chemical resistance, and a technique of joining a thermoplastic resin by laser welding is disclosed in Japanese Unexamined Patent Publication Nos. 2006-205619, 2006-168221, 2006-096886, 2005-015792 and 2005-007759. These techniques consist of joining together members each comprising polyphenylene sulfide.

However, polyphenylene sulfide is expensive and therefore, polyphenylene sulfide may only be used in a site requiring heat resistance, chemical resistance or the like, and form the remaining sites from other thermoplastic resins, thereby obtaining an inexpensive molded resin product while ensuring durability. Polyphenylene sulfide also has a high melting point, but an organic dye having heat resistance close to the melting point is not found at present. Accordingly, there is a problem that when a molded resin product is produced using only members comprising polyphenylene sulfide, the product cannot be colored in a desired color and is restricted in design.

In order to solve this problem, a technique of joining together a member comprising polyphenylene sulfide and a member comprising a relatively inexpensive and colorable thermoplastic polyester having a low melting point, by laser welding is desired.

However, it is difficult to weld together two members comprising such different thermoplastic resins.

A technique for achieving laser welding of members comprising different thermoplastic resins is disclosed in Japanese Unexamined Patent Publication No. 2006-312303. In this technique, a compatibilizer being compatible with both a thermoplastic resin constituting a first resin molding and a thermoplastic resin constituting a second resin molding is mixed in the resin composition of the second resin molding.

However, there is no compatibilizer that is compatible with both polyphenylene sulfide and a thermoplastic ester, and therefore, this technique cannot be employed in joining together a member comprising polyphenylene sulfide and a member comprising a thermoplastic polyester.

SUMMARY OF INVENTION

The present invention has been made by taking these conventional problems into consideration, and an object of the present invention is to provide an easily producible and inexpensive molded resin product excellent in heat resistance and appearance, and a production method thereof.

A first invention is a molded resin product obtained by irradiating laser light on an overlapping part having overlapped therein a transmitting material mainly comprising a thermoplastic polyester and transmitting laser light, and an absorbing material mainly comprising polyphenylene sulfide and absorbing laser light, from the transmitting material side to weld together the transmitting material and the absorbing material,
wherein the transmitting material comprises polyamide 6 blended in the thermoplastic polyester.

The operations and effects of the present invention are described below.

The molded resin article comprises an absorbing material mainly comprising polyphenylene sulfide (PPS) and a transmitting material mainly comprising a thermoplastic polyester. Accordingly, an inexpensive molded resin product compared with a product composed of only members comprising PPS can be obtained. A transmitting material comprising an easily colorable thermoplastic polyester is used as a part of the molded resin product, so that the product can be colored in a desired color, if desired, and a molded resin product with excellent appearance can be obtained.

Furthermore, since the transmitting material and the absorbing material are joined together by laser welding, it is not necessary to perform bonding or the like by using an adhesive material, and production thereof is easy.

The transmitting material mainly comprising a thermoplastic polyester and the absorbing material mainly comprising polyphenylene sulfide are composed of heterogeneous materials, and therefore, are usually difficult to join together by laser welding. Consequently, the present inventors have formulated them by blending a compatibilizer having compatibility (having a close SP value, described later) with PPS constituting the absorbing material, in the thermoplastic polyester constituting the transmitting material. However, if the transmitting material is decreased in the transmission of laser light due to the mixing of the compatibilizer in the transmitting material, laser welding becomes difficult. If the material used as the compatibilizer has a melting point greatly different from that of the thermoplastic polyester constituting the transmitting material, the molding of the transmitting material becomes difficult.

For these reasons, a thermoplastic resin having excellent compatibility (a small SP value) with PPS and high transmittance, having a refractive index close to the refractive index of the thermoplastic polyester and further having a melting point close to that of the thermoplastic polyester needs to be used as the compatibilizer.

Accordingly, the present inventors have found that when polyamide 6 (PA6) which is a thermoplastic resin satisfying all of these conditions is blended in the resin constituting the transmitting material, an absorbing material mainly comprising PPS and a transmitting material mainly comprising a thermoplastic polyester can be easily joined together by laser welding.

In other words, polyamide 6 has an SP value close to that of PPS and exhibits excellent compatibility with PPS and therefore, by virtue of mixing polyamide 6 in the transmitting material, the transmitting material comprising a thermoplastic polyester and the absorbing material comprising PPS can be welded together (see, FIG. 4 described later). The SP value is the square root of the cohesive energy density, and is generally called a solubility parameter.

Polyamide 6 itself has high transmittance and has a small difference in the refractive index from the thermoplastic polyester and therefore, even when polyamide 6 is blended in the thermoplastic polyester, the transmission of laser light in the transmitting material is less reduced and a satisfactory transmittance can be maintained (see, FIGS. 5 to 7 described later). As a result, laser welding is not inhibited.

Furthermore, the melting point of polyamide 6 is approximate to that of the thermoplastic polyester and therefore, there is no reduction in the moldability of the transmitting material by the blending of polyamide (see, FIG. 8 described later).

In this way, by blending polyamide 6 in the thermoplastic polyester, a transmitting material mainly comprising a thermoplastic polyester and an absorbing material mainly comprising PPS can be joined together by laser welding without causing any particular trouble.

As described above, according to the present invention, an easily producible and inexpensive molded resin product excellent in heat resistance and appearance can be provided.

A second invention is a method for producing a molded resin product, comprising:

overlapping a transmitting material mainly comprising a thermoplastic polyester and transmitting laser light, and an absorbing material mainly comprising polyphenylene sulfide and absorbing laser light, and irradiating laser light on the overlapping part from the transmitting material side to weld together the transmitting material and the absorbing material, thereby producing a molded resin product, wherein the transmitting material comprises polyamide 6 blended in the thermoplastic polyester.

According to the present invention, an inexpensive molded resin product excellent in heat resistance and appearance can be easily produced.

DETAILED DESCRIPTION

Figure 1:
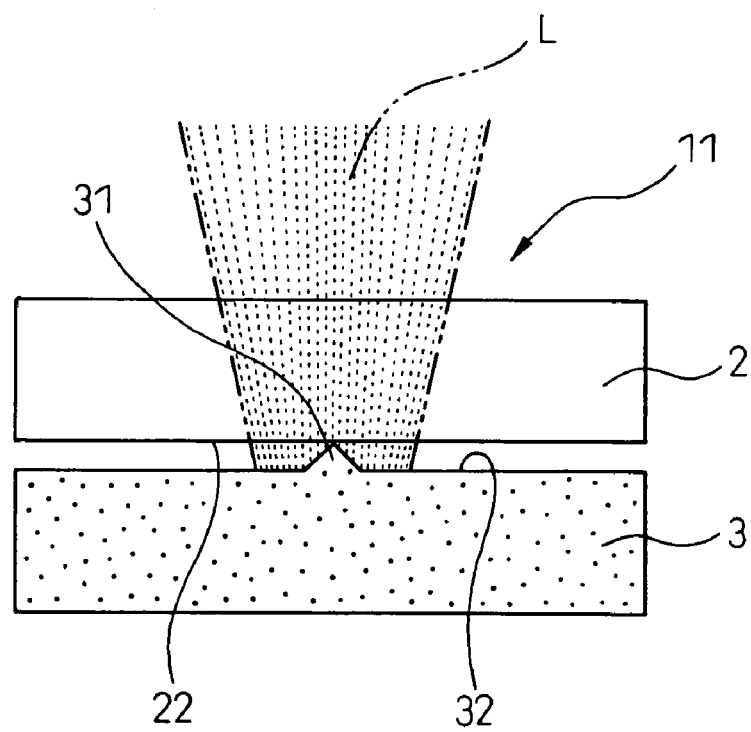
FIG. 1 is a drawing illustrating an explanatory view showing the production method of a molded resin product in Example 1.

In the first invention or second invention, the molded resin product may be a product obtained by joining together two or more transmitting materials and two or more absorbing materials.

Regarding the laser light, for example, laser light of a semiconductor laser such as GaAs-based laser may be used.

Examples of the thermoplastic polyester which is the main component of the absorbing material include polybutylene terephthalate (PBT), polypropylene terephthalate (PPT) and PET (polyethylene terephthalate).

A protruding part is preferably formed on at least one of mutually facing surfaces of the transmitting material and the absorbing material in the overlapping part.

In this case, when laser light is irradiated on the overlapping part including the protruding part, polyamide 6 mixed in the transmitting material and PPS of the absorbing material are satisfactorily melted together starting from the protruding part, whereby the joining strength between the transmitting material and the absorbing material can be enhanced.

The transmitting material preferably comprises polyamide 6 in a weight ratio of 30 wt % or more based on the total weight of the thermoplastic polyester and polyamide 6.

In this case, by virtue of blending polyamide 6, the joining strength between the transmitting material and the absorbing material can be satisfactorily enhanced.

Incidentally, if the weight ratio of polyamide 6 is less than 30 wt %, it may be difficult to join the transmitting material and absorbing material.

The transmitting material preferably comprises polyamide 6 in a weight ratio of 40 wt % or more based on the total weight of the thermoplastic polyester and polyamide 6.

In this case, the joining strength between transmitting material and the absorbing material can be enhanced more.

Incidentally, if the weight ratio of polyamide 6 exceeds 50 wt %, the thermoplastic polyester will no longer be the main component in the transmitting material and the advantages provided by the thermoplastic polyester, such as dimensional stability even if water is absorbed and stability of electrical properties, may not be satisfactorily obtained.

For this reason, the transmitting material preferably has polyamide 6 dispersed in the thermoplastic polyester as a continuous phase.

A filler which transmits laser light is preferably added to the transmitting material.

In this case, an increase in the mechanical strength of the transmitting material and a reduction in the cost can be achieved and a low-cost molded resin product with excellent mechanical strength can be obtained.

Examples of the filler which can be used include glass fiber and glass bead.

A colorant which transmits laser light is preferably added to the transmitting material.

In this case, by adding a colorant of a desired color to the transmitting material, a transmitting material in a desired color can be obtained, whereby the appearance of the molded resin product can be enhanced. Since the colorant transmits laser light, laser welding is not inhibited by the colorant.

Examples of the colorant which can be used include, as a red colorant, an organic pigment such as lake red; as a blue colorant, an inorganic pigment such as cobalt blue and an organic pigment such as phthalocyanine blue; and as a green colorant, an inorganic pigment such as chrome green and an organic pigment such as phthalocyanine green.

Carbon black is preferably added to the absorbing material.

In this case, the absorbing material can sufficiently absorb laser light and therefore, high welding strength can be obtained.

The carbon black is preferably added in an amount of 0.01 to 10 wt % to the absorbing material.

In this case, welding strength between the absorbing material and the transmitting material can be satisfactorily ensured.

If the amount of the carbon black added is less than 0.01 wt %, it is difficult for the absorbing material to sufficiently absorb laser light, and sufficiently high welding strength may not be obtained, whereas if the amount added exceeds 10 wt %, reduction in the insulating property or strength may result.

The molded resin product may be an automotive component.

In this case, an automotive component with excellent heat resistance can be obtained. In other words, the absorbing material in the molded resin product of the present invention is excellent in heat resistance as described above and therefore, the molded resin product is suitable as an automotive component requiring heat resistance. In particular, when used as a the molded resin product, a site which requires heat resistance is composed of the absorbing material, and a site requiring relatively less heat resistance is composed of the transmitting material, therefore, enhancement of the appearance and a reduction in cost can be achieved while ensuring heat resistance.

Examples of the automotive component include a crank angular sensor fixed to an automobile engine, various pressure sensors, an electronic throttle, and a case for housing various electronic substrates.

EXAMPLES

Example 1

The molded resin product and production method according to Example of the present invention are described below by referring to FIGS. 1 to 8.

Figure 2:
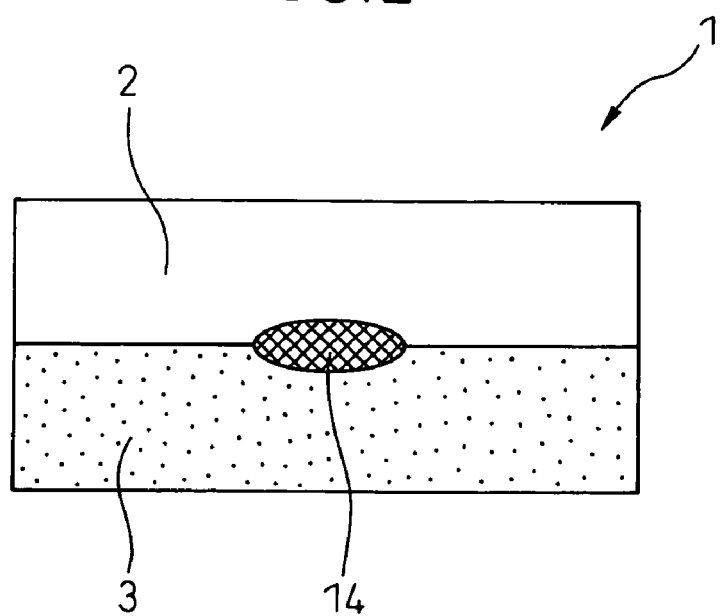
FIG. 2 is a drawing illustrating an explanatory view of the molded resin product after welding in Example 1.

The molded resin product 1 of this Example is obtained by, as shown in FIG. 1, irradiating laser light L on an overlapping part 11 having overlapped therein a transmitting material 2 mainly comprising a thermoplastic polyester and transmitting laser light, and an absorbing material 3 mainly comprising polyphenylene sulfide (PPS) and absorbing laser light, from the side of the transmitting material 2 to weld together the transmitting material 2 and the absorbing material 3. In FIG. 2, numeral 14 indicates the welded part.

The transmitting material 2 comprises polyamide 6 (PA6) blended in the thermoplastic polyester.

In this Example, polybutylene terephthalate (PBT) is used as the thermoplastic polyester.

In the absorbing material 3, a protruding part 31 is formed on the surface 32 facing the transmitting material 2. In other words, the absorbing material 3 is constructed such that in the overlapping part 11, a protruding part 31 having, for example, a nearly triangular cross-section is provided on the surface 32 facing the transmitting material 2 to protrude to the side of the transmitting material 2. The protruding part 31 has a height of, for example, 0.1 mm or more.

When overlapping the transmitting material 2 and the absorbing material 3, the surface 22 of the transmitting material 2, which faces the absorbing material 3, is pressed onto the protruding part 31 of the absorbing material 3. In this state, laser light L is irradiated on a predetermined region of the overlapping part 11 by approximately centering the protruding part 31.

In the transmitting material 2, the weight ratio of PA6 to the total weight of PBT and PA6 is 30 wt % or more, preferably 40 wt % or more.

The transmitting material 2 is in a state of PA6 as a disperse phase being dispersed in PBT as a continuous phase.

In the transmitting material 2, a filler transmitting laser light L is added. Regarding the filler, for example, glass fiber or glass beads are used.

Furthermore, in the transmitting material 2, a colorant transmitting laser light is added. Regarding the colorant, there may be used, for example, as a red colorant, an organic pigment such as lake red; as a blue colorant, an inorganic pigment such as cobalt blue and an organic pigment such as phthalocyanine blue; and as a green colorant, an inorganic pigment such as chrome green and an organic pigment such as phthalocyanine green.

On the other hand, in the absorbing material 3, carbon black is added in an amount of 0.01 to 10 wt %.

Figure 3:
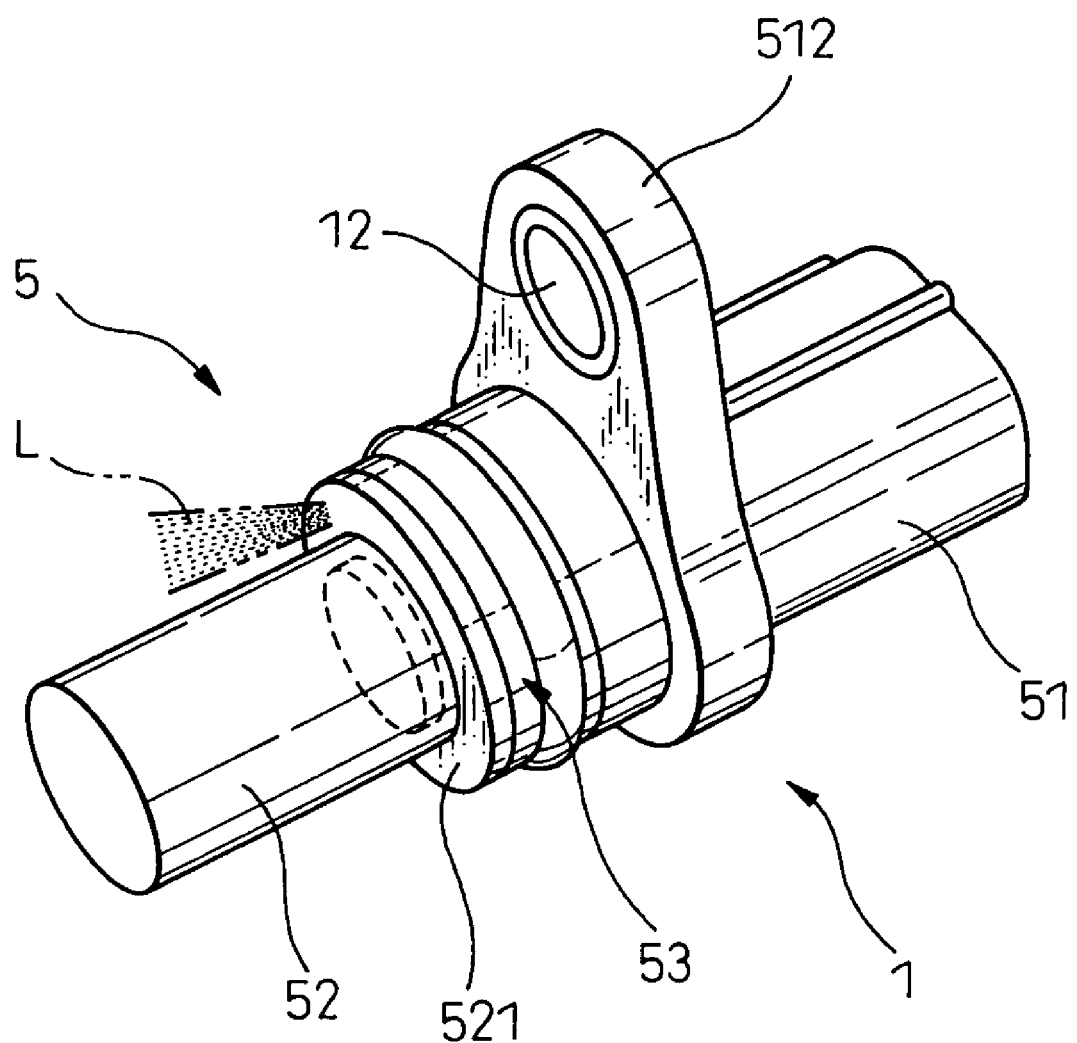
FIG. 3 is a drawing illustrating an explanatory view of the molded resin product in Example 1.

The molded resin product 1 of this Example is an automotive component and specifically, as shown in FIG. 3, constitutes a part of a crank angular sensor 5 fixed to an automobile engine, i.e., the cover part of the crank angular sensor 5. The molded resin product 1 is an insert molded article having inserted therein a metal member 12.

The crank angular sensor 5 is an MRE (magnetoresistive element) sensor and comprises, as shown in FIG. 3, a main body part 51 fixed to an engine and an element cover part 52 covering a sensor element. In the main body part 51, a fixing part 512 allowing to insert therethrough a bolt for fixing the crank angular sensor 5 to an engine is formed, and the metal member 12 is inserted into the fixing part 512.

The main body part 51 and the element cover part 52 are laser-welded together at the joining part 53. In other words, the main body part 51 corresponds to the absorbing material 3, the element cover part 52 corresponds to the transmitting material 2, and the joining part 53 corresponds to the overlapping part 11 (FIGS. 1 and 3).

The laser light L used is laser light of a GaAs-based semiconductor laser, and the wavelength thereof is 940 nm.

The element cover part 52 as the transmitting material 2 and the main body part 51 as the absorbing material 3 are laser-welded, for example, as follows.

First, as shown in FIG. 3, the element cover part 52 and the main body part 51 are fitted together such that a collar part 521 of the element cover 52 abuts on the main body part 51. In other words, the transmitting material 2 and the absorbing material 3 are overlapped.

Next, while applying pressure to the joining part 53 (overlapping part 11), laser light L is irradiated on the joining part 53 from the side of the element cover part 52 (transmitting material 2) (FIGS. 1 and 3). The laser light L is irradiated over the entire circumference of the joining part 53. At this time, the laser output is from 70 to 100 W, and the laser welding rate is from 30 to 40 mm/sec.

The laser light L passes through the transmitting material 2 and reaches the mutually facing surfaces 22 and 32 of the transmitting material 2 and the absorbing material 3, and the absorbing material 3 (PPS) at the facing surface 32 melts. The heat of the absorbing material 3 heated by the laser light L is transferred to the transmitting material 2, and the transmitting material 2 (PBT and PA6) in the facing surface 22 also melts. At this time, the protruding part 31 provided on the facing surface 32 of the absorbing material 3 aggressively melts, and PPS therein comes into contact with PA6 melted on the facing surface 22 of the transmitting material 2.

PPS of the melted absorbing material 3 and PA6 of the transmitting material 2 are compatibilized, and the absorbing material 3 and the transmitting material 2 are cooled in the state of being fused together, whereby both are joined.

This phenomenon occurs over the entire circumference of the joining part 53 between the main body part 51 and the element cover part 52, as a result, the main body part 51 (absorbing material 3) and the element cover part 52 (transmitting material 2) are welded and joined together.

The operations and effects of this Example are described below.

The molded resin article 1 above comprises an absorbing material 3 mainly comprising polyphenylene sulfide (PPS), and a transmitting material 2 mainly comprising PBT. Accordingly, an inexpensive molded resin product 1 as compared with a product composed of only members comprising PPS can be obtained. A transmitting material 2 comprising easily colorable PBT is used as a part of the molded resin product 1, so that the product can be colored in a desired color, if desired, and a molded resin product 1 with excellent appearance can be obtained.

Furthermore, since the transmitting material 2 and the absorbing material 3 are joined together by laser welding, it is not necessary to perform bonding or the like by using an adhesive material, and the production is easy.

In addition, polyamide 6 (PA6) is blended in PBT constituting the transmitting material 2, whereby an absorbing material 3 mainly comprising PPS and a transmitting material 2 mainly comprising PBT can be easily joined together by laser welding.

Figure 4:
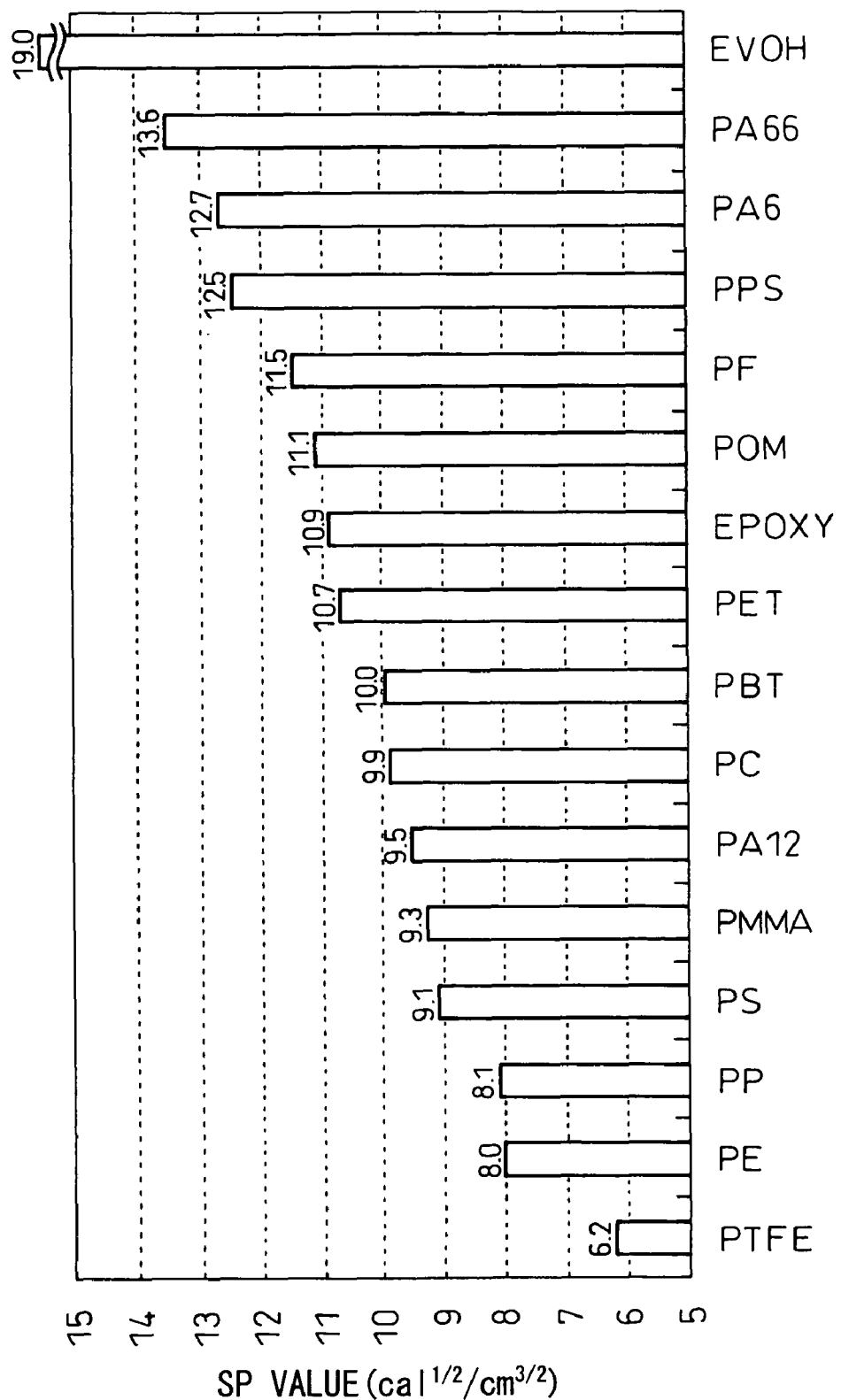
FIG. 4 is a drawing illustrating a graph showing SP values of various resins in Example 1.

In other words, as shown in FIG. 4, PA6 has an SP value close to that of PPS and exhibits excellent compatibility with PPS, so that by virtue of mixing PA6 in the transmitting material 2, the transmitting material comprising PBT and the absorbing material 3 comprising PPS can be welded together.

FIG. 4 is a graph comparing the SP values of PTFE (polytetrafluoroethylene), PE (polyethylene), PP (polypropylene), PS (polystyrene), PMMA (methacrylic resin), PA12 (polyamide 12), PC (polycarbonate), PBT (polybutylene terephthalate), PET (polyethylene terephthalate), EPOXY (epoxy), POM (polyacetal), PF (phenol resin), PPS (polyphenylene sulfide), PA6 (polyamide 6), PA66 (polyamide 66), and EVOH (ethylene-vinyl alcohol copolymerization resin).

Figure 5:
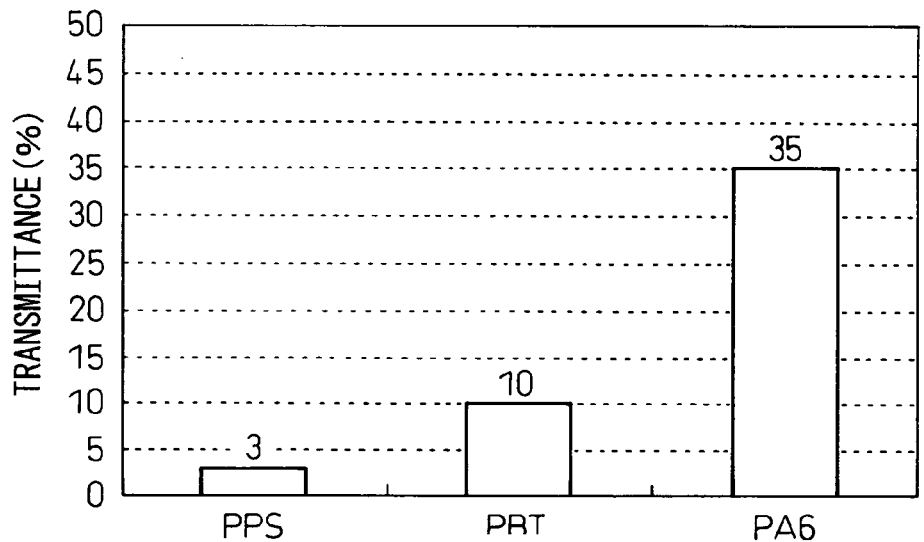
FIG. 5 is a drawing illustrating a graph showing transmittances of various resins in Example 1.
Figure 6:
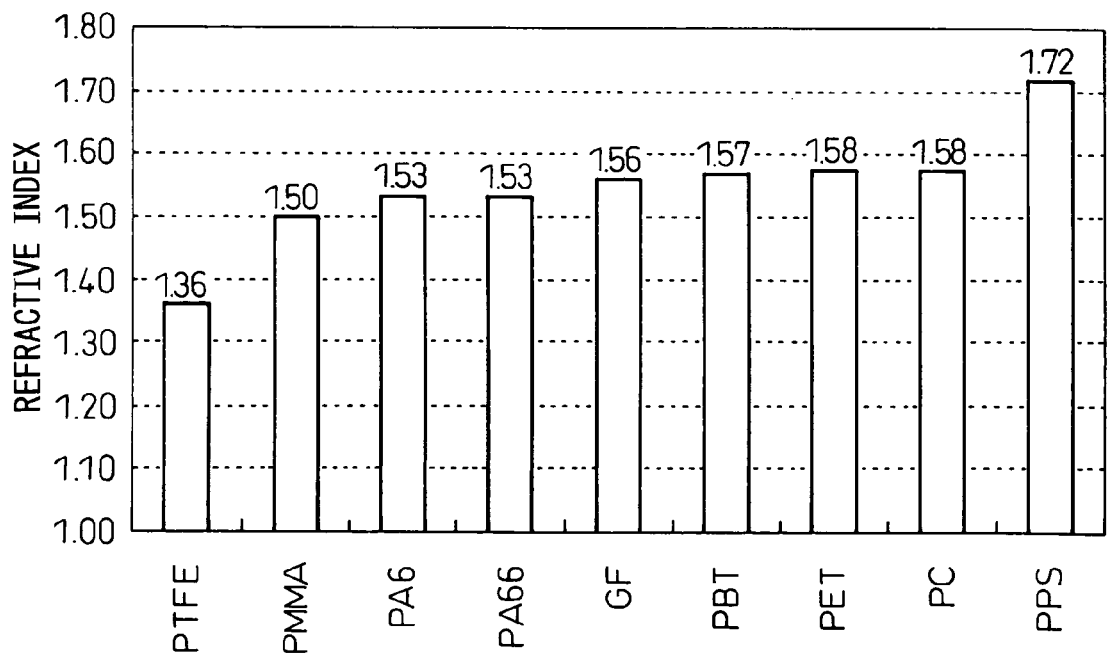
FIG. 6 is a drawing illustrating a graph showing refractive indexes of various resins in Example 1.
Figure 7:
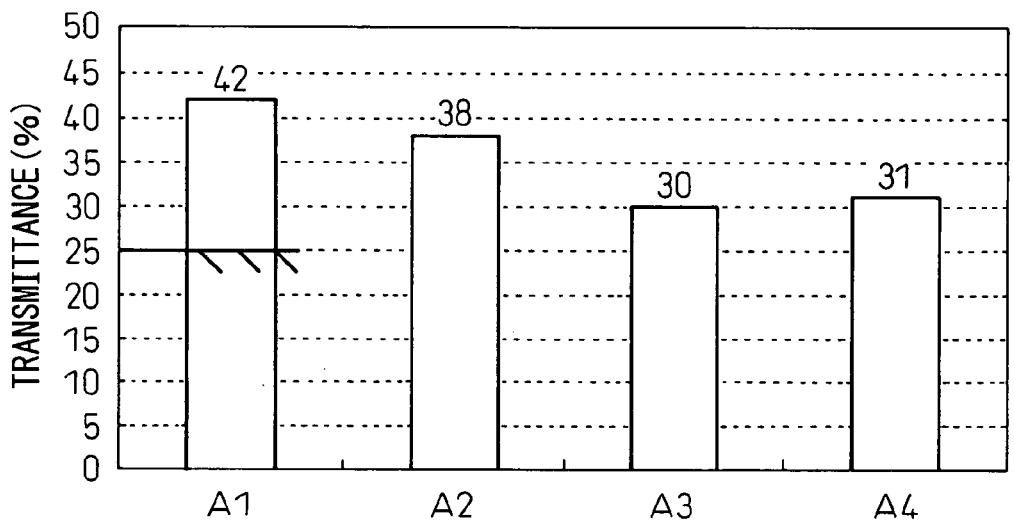
FIG. 7 is a drawing illustrating a graph showing refractive indexes of various transmitting materials in Example 1.

As shown in FIG. 5, PA6 itself has high transmittance, and as shown in FIG. 6, has a small difference in the refractive index from PBT, and therefore, even when PA6 is blended in PBT, the transmission of laser light L in the transmitting material 2 is, as shown in FIG. 7, less reduced, and a transmittance of 25% or more, at which laser welding is not inhibited, is satisfactorily ensured.

FIG. 5 is a graph comparing the transmittances of PPS, PBT and PA6, and FIG. 6 is a graph comparing refractive indexes of respective raw materials. In FIG. 6, GF indicates glass fiber. The transmittance shown in FIG. 5 is for laser light at a wavelength of 940 nm.

The transmittance of PET is about 10%, similarly to PBT.

FIG. 7 shows transmittances for laser light (wavelength: 940 nm) of a raw material (A1) comprising only PBT, a raw material (A2) obtained by blending 30 wt % of glass fiber in PBT, a raw material (A3) obtained by blending 30 wt % of glass fiber in a mixed resin of PBT:PA6=70:30, and a raw material (A4) obtained by blending 30 wt % of glass fiber in a mixed resin of PBT:PA6=60:40.

Figure 8:
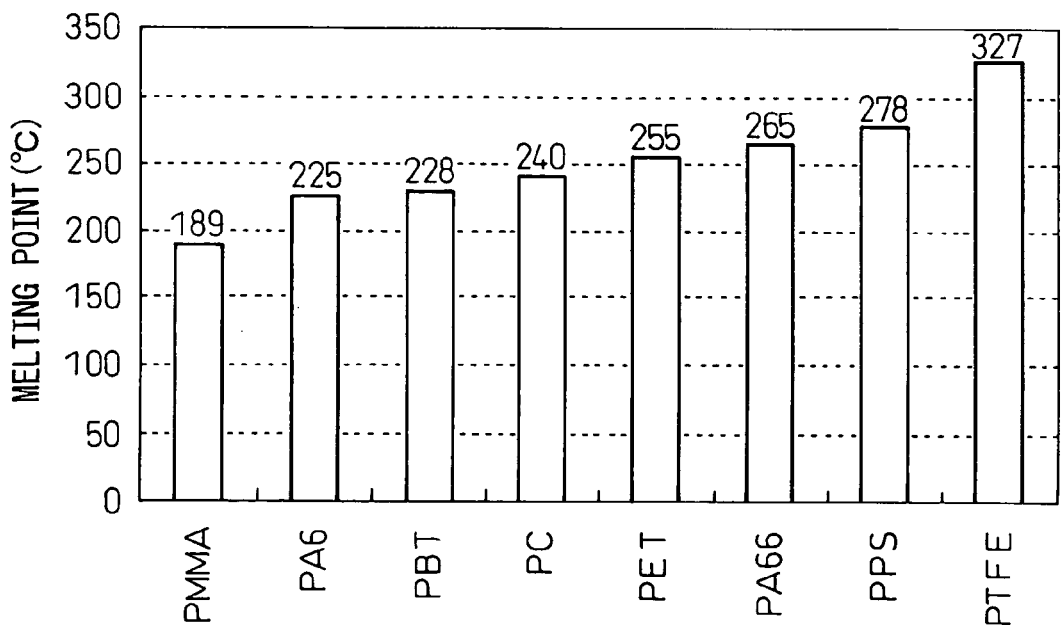
FIG. 8 is a drawing illustrating a graph showing melting points of various resins in Example 1.

Furthermore, as shown in FIG. 8, the melting point of PA6 is approximate to that of PBT, and therefore, reduction in the moldability of the transmitting material 2 is not incurred by the blending of PA6. FIG. 8 shows the melting point of each resin.

In this way, by virtue of blending PA6 in PBT, the transmitting material 2 mainly comprising PBT and the absorbing material 3 mainly comprising PPS can be joined together by laser welding without causing any particular trouble.

A protruding part 31 is formed on the absorbing material 3. Therefore, when laser light L is irradiated on the overlapping part 11 including the protruding part 31, PA6 mixed in the transmitting material 2 and PPS of the absorbing material 3 are satisfactorily melted together starting from the protruding part 31, whereby the joining strength between the transmitting material 2 and the absorbing material 3 can be enhanced.

In the transmitting material 2, the weight ratio of PA6 to the total weight of PBT and PA6 is 30 wt % or more, so that enhancement of the joining strength between the transmitting material 2 and the absorbing material 3, which is favored by the blending of PA6, can be satisfactorily achieved. By blending PA6 in a weight ratio of 40 wt % or more, the joining strength between the transmitting material 2 and the absorbing material 3 can be enhanced more.

In the transmitting material 2, a filler is added, so that increase in the mechanical strength of the transmitting material 2 and decrease in the cost can be achieved and a low-cost molded resin product 1 with excellent mechanical strength can be obtained.

In the transmitting material 2, a colorant which transmits laser light is added. Accordingly, a transmitting material 2 in a desired color can be obtained, whereby the appearance of the molded resin product 1 can be enhanced. Since the colorant transmits laser light L, the laser welding is not inhibited by the colorant.

In the absorbing material 3, carbon black is added, so that the absorbing material 3 can satisfactorily absorb laser light L and high welding strength can be obtained.

The carbon black is added in an amount of 0.01 to 10 wt % to the absorbing material 3, so that the welding strength between the absorbing material 3 and the transmitting material 2 can be satisfactorily ensured.

The molded resin product 1 of this Example is a crank angular sensor 5 which is an automotive component, and therefore, can be a product suitable as an automotive component requiring high heat resistance. The absorbing material 3 in the molded resin product 1 of the present invention is, as described above, excellent in the heat resistance, so that when, in the molded resin product 1, particularly a site requiring heat resistance is composed of the absorbing material 3, and a site requiring relatively less heat resistance is composed of the transmitting material 2, enhancement of the appearance and a reduction in cost can be achieved while ensuring heat resistance.

As described in the foregoing pages, according to this Example, an easily producible and inexpensive molded resin product excellent in heat resistance and appearance can be provided.

Incidentally, in this Example, PBT is used as the thermoplastic polyester, but even when other thermoplastic polyesters such as PPT (polypropylene terephthalate) and PET (polyethylene terephthalate) are used, an easily producible and inexpensive molded resin product excellent in heat resistance and appearance can be provided as above. More specifically, as shown in FIGS. 6 and 8, the refractive index and melting point of PA6 approximate to also those of PET and therefore, the laser welding strength between the transmitting material 2 and the absorbing material 3 can be enhanced without inhibiting the transmission of laser light or deteriorating the moldability of the transmitting material 2.

Example 2

Figure 9:
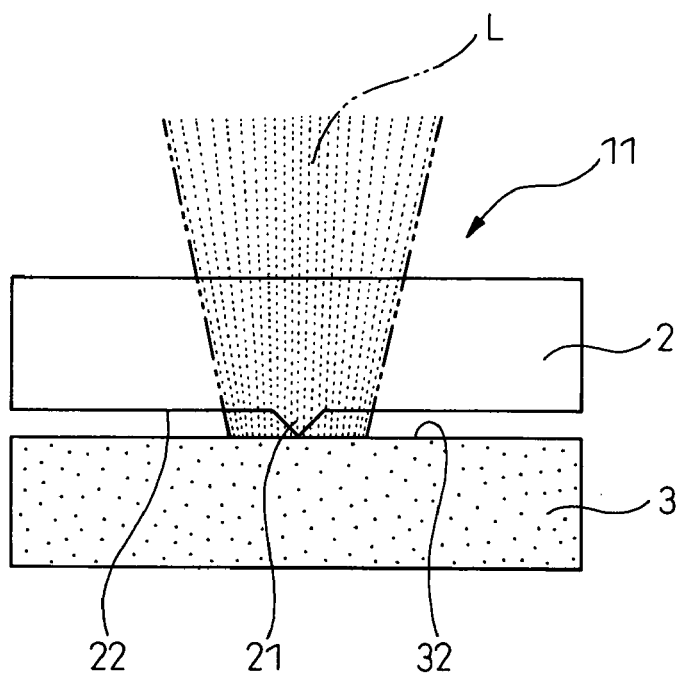
FIG. 9 is a drawing illustrating an explanatory view showing the production method of a molded resin product in Example 2.

In this Example, as shown in FIG. 9, a protruding part 21 is provided on the transmitting material 2.

In other words, a protruding part 21 having a nearly triangular cross-section is provided on the surface 22 of the transmitting material 2, which faces the absorbing material 3, in the overlapping part 11. On the other hand, a protruding part is not provided on the absorbing material 3.

When overlapping the transmitting material 2 with the absorbing material 3, the protruding part 21 of the transmitting material 2 is pressed onto the facing surface 32 of the absorbing material 3. In this state, laser light L is irradiated on a predetermined region of the overlapping part 11 by approximately centering the protruding part 21.

Others are the same as in Example 1.

In this Example, when laser light L is irradiated on the overlapping part 11 including the protruding part 21, PA6 mixed in the transmitting material 2 and PPS of the absorbing material 3 are satisfactorily melted together starting from the protruding part 21, whereby the joining strength between the transmitting material 2 and the absorbing material 3 can be enhanced.

Other operations and effects are the same as in Example 1.

Incidentally, protruding parts 21 and 31 may be provided on both the transmitting material 2 and the absorbing material 3. A plurality of protruding parts 21 or a plurality of protruding parts 31 may be formed.

Example 3

Figure 10:
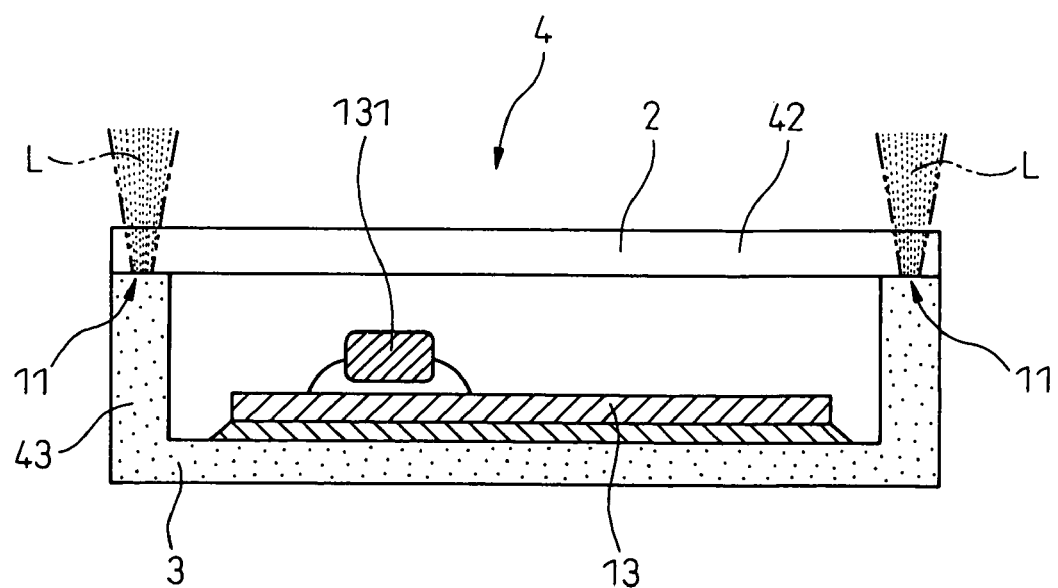
FIG. 10 is a drawing illustrating an explanatory view of the molded resin product in Example 3.

In this Example, as shown in FIG. 10, the molded resin product 1 of the present invention is applied to a case for housing an electronic substrate 13.

In other words, the case 4 as the molded resin product 1 comprises a housing part 43 having an opening, and a cover part 42 covering the opening of the housing part 43. The housing part 43 comprises an absorbing material 3, and the cover part 42 comprises a transmitting material 2.

An electronic substrate 13 having mounted thereon an electronic component 131 is housed in the housing part 43 (absorbing material 3) of the case 4 (molded resin product 1), the cover part 42 (transmitting material 2) is overlapped therewith to cover the opening of the housing part, and laser light L is irradiated on the overlapping part 11, thereby effecting laser welding.

By these operations, a case 4 (molded resin product 1) housing an electronic component 13 in the inside is obtained.

Others are the same as in Example 1.

This Example also has the same operations and same effects as in Example 1.

Example 4

In this Example, the effect of enhancing the laser welding strength, which is favored, as shown in FIGS. 11(A) to 14, by blending PA6 in PBT of the transmitting material 2, is confirmed.

In other words, the welding strength between the transmitting material 2 having various compositions and the absorbing material 3 is measured by the following method.

Figure 11A:
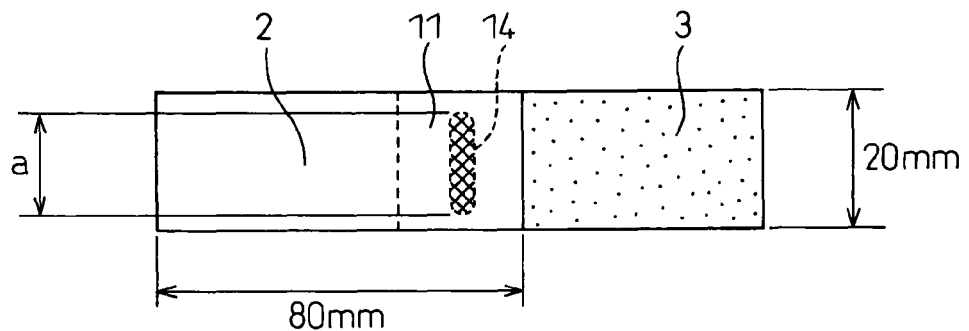
FIGS. 11(A) and 11(B) are drawings illustrating an explanatory view of the tensile test method in Example 4.
Figure 11B:
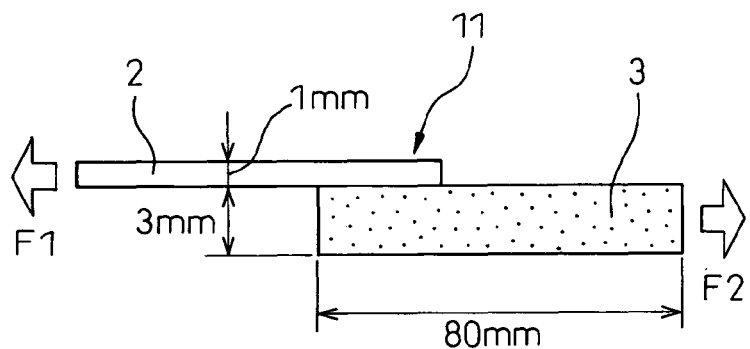

First, as shown in FIGS. 11(A) and 11(B), a specimen having a width of 20 mm, a length of 80 mm and a thickness of 3 mm was prepared as the absorbing material 3. The absorbing material 3 comprises PPS having added thereto 40 wt % of glass fiber and 0.5 wt % of carbon black.

Separately, a specimen having a width of 20 mm, a length of 80 mm and a thickness of 1 mm was prepared as the transmitting material 2. This specimen of the transmitting material 2 has the following compositions according to respective levels. In other words, the level 1 uses a transmitting material 2 having not blended therein PA6, the level 2 uses a transmitting material 2 having blended therein PA6 in a ratio of PBT:PA6=7:3, and the levels 3 and 4 use a transmitting material 2 having blended therein PA6 in a ratio of PBT:PA6=6:4. In all of these transmitting materials 2, 30 wt % of glass fiber is added.

As for the levels 1 to 3, a protruding part 31 (see, FIG. 1) having a nearly triangular cross-section is provided on the absorbing material 3. The height of the protruding part 31 is 0.3 mm. As for the level 4, a protruding part 31 is not provided on the absorbing material 3.

Figure 12:
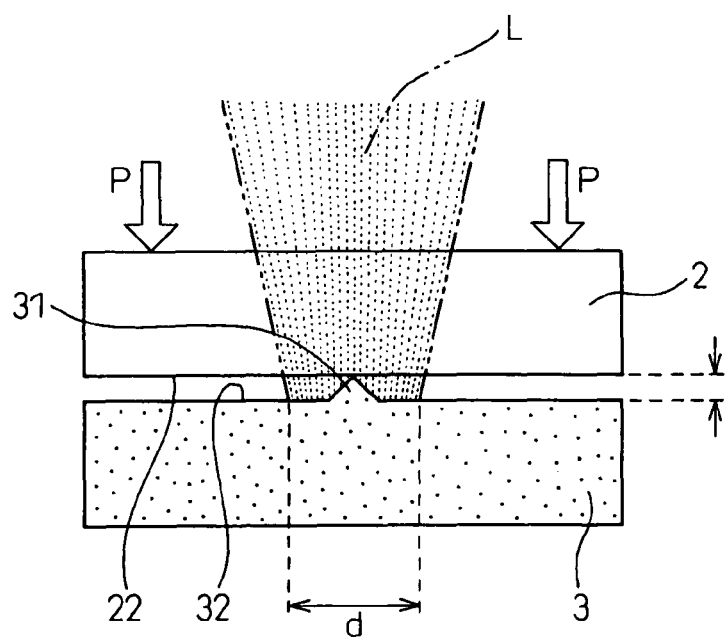
FIG. 12 is a drawing illustrating an explanatory view of the method for preparing a test sample in Example 4.

In each level, as shown in FIGS. 11(A) to 13, the absorbing material 3 and the transmitting material 2 are overlapped over 20 mm and at the same time, laser light L is irradiated on the overlapping part 11 in the state of, as shown by an arrow P in FIG. 12, pressurizing the transmitting material 2 toward the absorbing material 3. The wavelength of laser light L is 940 nm, the irradiation diameter d is 2 mm, and the scanning rate is 35 mm/sec.

Figure 13:
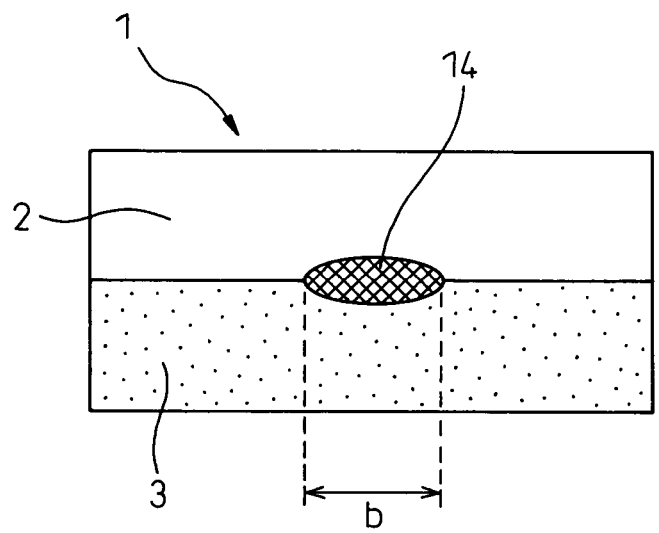
FIG. 13 is a drawing illustrating an explanatory view of the weld part of the test sample in Example 4.

By these operations, as shown in FIGS. 11(A), 11(B) and 13, the transmitting material 2 and the absorbing material 3 are welded together. At this time, the length of the weld part 14 is 12.5 mm and the width b is 2.3 mm.

The transmitting material 2 and the absorbing material 3 are pulled to the directions shown by arrows F1 and F2 in FIG. 11(B), and measured for the shear failure strength. In other words, in this shear test, the force applied when the resin product is broken is the shear failure strength, and FIG. 14 shows these results as the welding strength.

Figure 14:
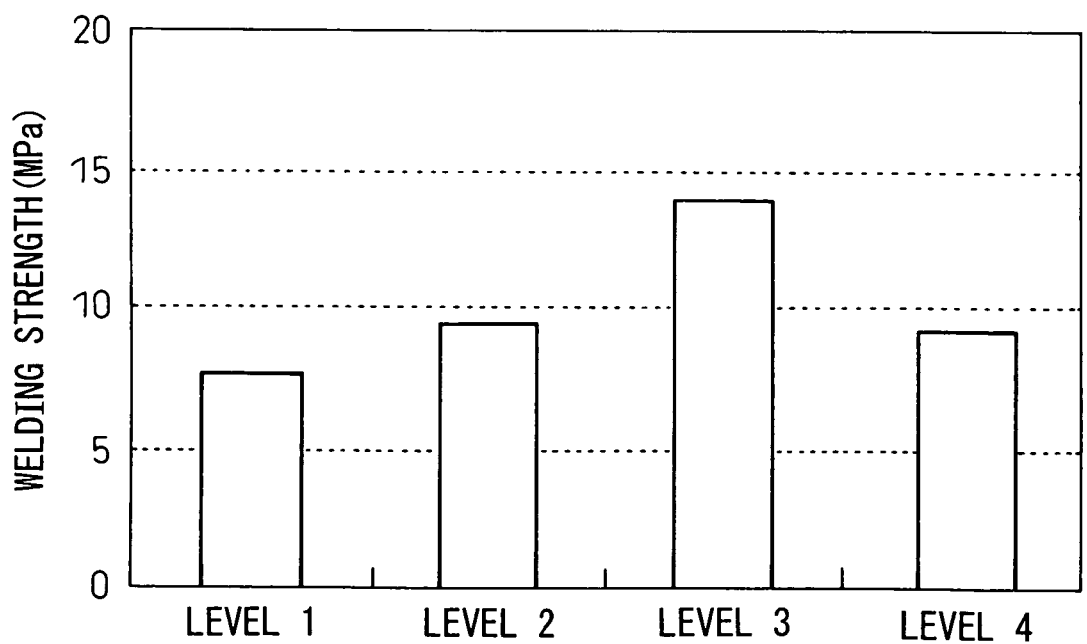
FIG. 14 is a drawing illustrating a diagram showing the test results in Example 4.

As seen from FIG. 14, the welding strength of the level 2 using a transmitting material 2 where PA6 is blended in PBT is high as compared with the level 1 using a transmitting material 2 where PA6 is not blended in PBT. In the level 3 using a transmitting material 2 where the amount of PA6 blended is increased to PBT:PA6=6:4, the welding strength is more increased. In other words, the measured value of the welding strength is 14 MPa, and since the fracture mode is the matrix fracture, that is, fracture of the transmitting material 2 or absorbing material 3 itself, the actual welding strength becomes 14 MPa or more.

In the level 4 where an absorbing material 3 having not provided thereon a protruding part 31 and a transmitting material 2 are welded together, the welding strength is decreased as compared with the level 3 having the same composition. By virtue of providing a protruding part 31, sufficiently high welding strength is obtained as in the level 3.

As described in the foregoing pages, according to this Example, it can be confirmed that the welding strength is enhanced by blending an appropriate amount of PA6 in PBT of the transmitting material 2 and furthermore, the welding strength is enhanced by providing a protruding part 31.

I claim:

1. A molded resin product obtained by irradiating laser light on an overlapping part having overlapped therein a transmitting material mainly comprising a thermoplastic polyester and transmitting laser light, and an absorbing material mainly comprising polyphenylene sulfide and absorbing laser light, from said transmitting material side to weld together said transmitting material and said absorbing material, wherein said transmitting material comprises polyamide 6 blended in said thermoplastic polyester.

2. The molded resin product according to claim 1, wherein a protruding part is formed on at least one of mutually facing surfaces of said transmitting material and said absorbing material in said overlapping part.

3. The molded resin product according to claim 1, wherein said transmitting material comprises said polyamide 6 in a weight ratio of 30 wt % or more based on the total weight of said thermoplastic polyester and said polyamide 6.

4. The molded resin product according to claim 3, wherein said transmitting material comprises said polyamide 6 in a weight ratio of 40 wt % or more based on the total weight of said thermoplastic polyester and said polyamide 6.

5. The molded resin product according to claim 1, wherein a filler which transmits laser light is added to said transmitting material.

6. The molded resin product according to claim 1, wherein a colorant which transmits laser light is added to said transmitting material.

7. The molded resin product according to claim 1, wherein carbon black is added to said absorbing material.

8. The molded resin product according to claim 7, wherein said carbon black is added in an amount of 0.01 to 10 wt % to said absorbing material.

9. The molded resin product according to claim 1, wherein said molded resin product is an automotive component.

* * * * *